(12) United States Patent
Gomes et al.

(10) Patent No.: US 8,329,223 B2
(45) Date of Patent: Dec. 11, 2012

(54) DOUBLE WALLED MICROCAPSULES WITH AN OUTER THERMOPLASTIC WALL AND APPLICATION PROCESS THEREOF

(75) Inventors: Jaime Isidoro Naylor Da Rocha Gomes, Braga (PT); Carlos Joaquim Esteves Lima, Braga (PT)

(73) Assignee: Devan-Micropolis SA, Moreira Da Maia (PT)

( * ) Notice: Subject to any disclaimer, the term of this patent is extended or adjusted under 35 U.S.C. 154(b) by 929 days.

(21) Appl. No.: 10/544,772

(22) PCT Filed: Aug. 26, 2003

(86) PCT No.: PCT/PT03/00011
§ 371 (c)(1),
(2), (4) Date: Aug. 8, 2005

(87) PCT Pub. No.: WO2005/018795
PCT Pub. Date: Mar. 3, 2005

(65) Prior Publication Data
US 2006/0188582 A1  Aug. 24, 2006

(51) Int. Cl.
*A61K 9/16* (2006.01)
(52) U.S. Cl. .................................................. 424/490
(58) Field of Classification Search ........................ None
See application file for complete search history.

(56) References Cited

U.S. PATENT DOCUMENTS

| 3,415,186 A | 12/1968 | Fend |
| 3,824,114 A | 7/1974 | Vassiliades et al. |
| 4,028,118 A * | 6/1977 | Nakasuji et al. ........... 106/31.19 |
| 4,582,756 A | 4/1986 | Niinuma et al. |
| 4,880,721 A | 11/1989 | Ishikawa |
| 5,366,801 A | 11/1994 | Bryant et al. |
| 6,252,003 B1 * | 6/2001 | Kuwahara et al. ............ 525/242 |
| 2001/0046826 A1 | 11/2001 | Tebbe |
| 2005/0227047 A1 * | 10/2005 | Sutter et al. ................ 428/195.1 |

FOREIGN PATENT DOCUMENTS

| GB | 1307152 | * | 2/1973 |
| GB | 1 390 939 A | | 4/1975 |
| GB | 1 502 440 A | | 3/1978 |
| WO | WO02/095314 | * | 11/2002 |

* cited by examiner

*Primary Examiner* — Daniel Sullivan
*Assistant Examiner* — Trevor Love
(74) *Attorney, Agent, or Firm* — Sughrue Mion, PLLC

(57) ABSTRACT

The present invention concerns double-walled microcapsules with an outer thermoplastic wall and an application process thereof on substrates, namely textile substrate. The microcapsules are applied to fibers so as to produce a slow release of products such as fragrances, antimicrobial, insecticides, antioxidants, vitamins or they can be used as materials such as thermochromic pigments, that change color when heated, or "phase change materials" (PCM), that convey thermal insulation/control.

6 Claims, 1 Drawing Sheet

DOUBLE WALLED MICROCAPSULES WITH AN OUTER THERMOPLASTIC WALL AND APPLICATION PROCESS THEREOF

CROSS REFERENCE TO RELATED APPLICATION

This application is the National Stage of PCT Application No. PCT/PT2003/00011, filed Aug. 26, 2003, the contents of all of which are incorporated herein by reference in their entirety.

The present invention concerns double-walled microcapsules with an outer thermoplastic wall and an application process thereof on substrates, namely textile substrate.

The microcapsules are applied to fibres so as to produce a slow release of products such as fragrances, antimicrobial, insecticides, antioxidants, vitamins or they can be used as materials such as thermochromic pigments, that change colour when heated, or "phase change materials" (PCM), that convey thermal insulation/control.

BACKGROUND TO THE INVENTION

The way microcapsules are bound to fibres is usually with binders that cover the whole area of the fibres and the microcapsules.

Usually microcapsules of controlled release are applied with binders on the surface of fabrics or knitwear so that they rupture by friction thereby releasing the active product, be it a fragrance, antimicrobial, insect repellent, antioxidant or vitamins.

Thermochromic pigments are also applied in this way. PCM need a thicker material so that they can act efficiently as an insulation or temperature regulating material. The application of PCM microcapsules to fibres with binders is described in the U.S. Pat. No. 5,366,801. Patent WO 0 212 607 describes an application to webs of fibres where the microcapsules of PCM are totally inside the binder and the binder forms a film at the intersection of the fibres.

U.S. Pat. No. 4,774,133 describes the incorporation of microcapsules in textile articles with a thermoplastic film that is applied with heat and pressure.

This application of binder means that a film is formed between the fibres, which makes permeability to air and vapour, and therefore body transpiration difficult.

SUMMARY OF THE INVENTION

The present invention, by contrast, consists of the application of individual microcapsules to fibres, the outer wall of the microcapsules being thermoplastic. In this way no film is formed and permeability to air and vapour is not significantly affected, as it is with a film of binder between the fibres.

The binder or film also makes the material less flexible, with worse drape, which is important for applications such as some apparel and eiderdowns, for example. With individual microcapsules fused on the fibres the flexibility and drape of the material are not affected as much.

With these new microcapsules, the outer wall is melted into the textile fibres, manufactured as a yarn, fabric or non-woven, heating up to the softening temperature or up to the melting temperature of the thermoplastic wall.

BRIEF DESCRIPTION OF THE DRAWINGS

In the drawings the different possibilities of binding by fusion between microcapsules and fibres are shown.

DETAILED DESCRIPTION OF THE INVENTION

Figure 1:
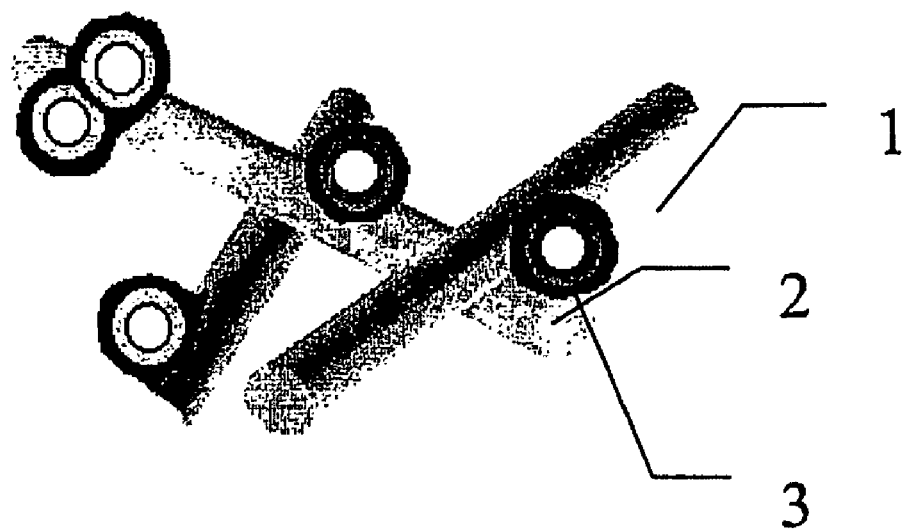
FIG. 1 represents fibres or filaments melted together with microcapsules with a thermoplastic outside wall.

The microcapsules of this invention, i.e. double walled microcapsules, also designated here as bicomponent microcapsules, have a thermoplastic outer wall. The outer wall is made up of a thermoplastic polymer such as polyethylene, polypropylene, polyamide, polyester, polystyrene, polyacrylate, polymethylmethacrylate, polyurethanes, polycarbonates or any other thermoplastic polymer, or copolymers of these polymers.

The aforesaid outer walls of the microcapsules are melted into the textile fibres, manufactured as a yarn, fabric or non-woven, heating up to the softening temperature or up to the melting temperature of the thermoplastic wall.

Pressure can also be applied to help the fusion of the microcapsules together with the fibres.

The previously mentioned microcapsules can be applied to the fibres by heating the fibrous structure containing the microcapsules, in a stenter or a calender with heated rollers, at a temperature which should be above the softening temperature of the thermoplastic outer walls of the microcapsules or/and the fibres.

The temperature and the pressure applied to the microcapsules can vary, depending on the polymer that makes up the outer wall of the fibre or the microcapsules. Thermoplastic materials generally have a transition temperature at which the material changes from a vitreous (glass) state to one which is visco-elastic, in which the material behaves more like a viscous fluid. This temperature ("glass transition temperature") depends on a number of factors such as the polymer structure, its molecular weight and the presence of additives such as plasticizers.

Fibres can also be bicomponent, with a softer outer wall and the core, which would be a polymer of a higher melting temperature than the outside wall and above the processing temperature used for the fusion of the walls of the microcapsules with the outer wall of the fibres. An example of bicomponent fibres is those used in non-woven webs of fibres, bound together by a process called "thermobonding". Another example are thermoplastic continuous filaments used in "spun-bonded" non-wovens.

The textile substrate (fibrous assembly) made up of fibres and microcapsules connected together only by the points of contact of their walls, does not need a binder to bind microcapsules and fibres. This has several advantages relating to materials on which binders are present, namely that binders are thermally conductive and lower the thermal resistivity of the fibrous assembly, whereas if more air is trapped between the fibres, like in the case of microcapsules fused to the fibres, the resistivity of the fibrous assembly remains much the same as without microcapsules. The binders used to fix the fibres in non-woven webs have a higher thermal conductivity than the air between the fibres, which is counterproductive to the objective of such fabrics, which is providing thermal insulation. This is why fibrous assemblies in which the fibres are fused together (thermobonded) are a better alternative, as claimed by U.S. Pat. No. 5,437,909. In the case of binders for non-wovens with microcapsules of PCM, phase change materials, excess binder is necessary to fix the microcapsules to the fibres. Phase change materials are used in non-woven webs for regulating the temperature of the body in articles such as winter coats, sports coats for mountaineering and ski, thus it is advisable that the thermal static insulation properties of the non-woven webs be kept unchanged.

Phase change materials, or PCM, are materials that change the phase from solid to liquid and from liquid to solid, with the particularity of absorbing large quantities of energy when changing from solid to liquid, releasing this energy when changing back from liquid to solid. Their capacity for retaining energy between the phase changes can also be used as a temperature control, within pre-defined limits, in winter clothes and footwear, by keeping the temperatures between 26 and 29° C., which are the limit temperatures of comfort for the human body. PCM should be contained in recipients or capsules, so as to avoid PCM spreading on the fabric. When applied on flexible materials such as textiles or leather, PCM should be applied in the form of microcapsules, microcapsules of PCM, so as to disperse through all the material in a homogeneous form and with maximum coverage, as described in U.S. Pat. Nos. 5,366,801 and 6,207,738. Another alternative is to introduce the microcapsules of PCM in the fibres during their production as described in U.S. Pat. Nos. 4,756,958 and 5,885,475 or to introduce the PCM into hollow fibres as described in U.S. Pat. No. 4,871,615. Given that the application of microcapsules of PCM on fabrics is not very effective, since it is difficult to fix enough microcapsules to the fabric, the excess of microcapsules being easily rubbed off during washing and wear, the microcapsules of PCM are usually applied on foam, usually made of polyurethane, or on non-wovens where they are fixed to the fibres by binders, as described in U.S. Pat. No. 581,338. These materials containing microcapsules are then incorporated in winter sport clothes or sports footwear. They can also be incorporated in composite materials such as described in U.S. Pat. No. 6,004,662. Patent WO 0 226 911 describes an agglomeration of microcapsules of PCM in macrocapsules of cross-linked gel. These capsules have a minimum size of 1000 microns and are not considered microcapsules, being categorised as macrocapsules. They are fixed onto the fibres with binders. On patent WO 0 224 789 a method of incorporation of microcapsules in polymers is described, which are then made into fibres or spheres.

Microcapsules of PCM are at the moment made of polymers of urea, or derivatives of urea and formaldehyde, or are made of melamine-formaldehyde polymers. One disadvantage of the walls made of these polymers, especially in melamine-formaldehyde polymer, is that they are porous and hygroscopic, which can be a problem when dispersing them in aqueous binders or in foam, such as the polyurethane foam.

This does not happen with the microcapsules of this invention, which have a thermoplastic second wall, making them especially suitable for direct mixing in polymeric coatings or foams.

Another problem associated with porosity is that, inside, PCM can evaporate through the pores when the microcapsules are heated above the boiling point of PCM, or they can be extorted by the action of solvents.

This does not happen with the microcapsules of the present invention, which have a thermoplastic second wall.

One disadvantage of the polymer being made of formaldehyde is that free formaldehyde can be released under humid conditions into the atmosphere or onto the skin.

Binders are usually acrylic or polyurethane binders, but they might have a small quantity of formaldehyde for cross-linking purposes. Formaldehyde causes skin irritation and inflammation of the nose and eyes and, in high quantities or with repeated exposure, it is toxic and a suspected carcinogen. It is therefore subjected to very strict limits.

With the second wall proposed in this patent, the formaldehyde is contained inside this second wall.

U.S. Pat. No. 6,080,418, describes microcapsules coated with adhesive for application to plants and trees by spraying. It does not mention their application to fibres and they are not applied by thermal fusion of the wall with the substrate.

In this invention, the microcapsules of PCM have an outer wall made up of polyethylene, polypropylene, polyamide, polyester, polystyrene, polyacrylate, polymethylmethacrylate, polyurethanes or any other thermoplastic polymer, or copolymers of these polymers. For higher resistance of the microcapsules, they should have an inner wall of a non-thermoplastic material or a material of a much higher TG, glass transition temperature, and melting point than the temperature used to soften or melt the outer wall.

For the inside wall, urea-formaldehyde or melamine-formaldehyde type polymers can be used and for the outside wall a thermoplastic polymer can be used.

The process of microencapsulation of solid particles in this case is usually referred to as coating, as in fact the layer resulting from such process is. The polymer used for coating the urea-formaldehyde or melamine-formaldehyde type microcapsules is a thermoplastic polymer. One of the methods of microencapsulation is a phase separation technique. For water-soluble or miscible core material, the phase separation process generally involves the technique of dispersing the solid core material of the desired particle size or an aqueous solution or suspension in a polymeric coating material dissolved in an organic solvent. The polymeric material is then deposited on the core material by gradual precipitation of the polymer. This is achieved either by the use of precipitants, by changes in the temperature, or by removal of the solvent by dilution or distillation. An example of this process is described in U.S. Pat. No. 4,166,800 to Fong. In this patent, the polymer is precipitated by a phase separation agent, a non-solvent for the polymer. The coating can be formed by polymerisation of a prepolymer around the solid core as mentioned in patent EP 1 088 584, which describes the polymerisation of a melamine-formaldehyde prepolymer on a solid particle.

The prepolymer can in this case be made up of the monomers that constitute the aforesaid thermoplastic polymers. These monomers undergo polymerisation round the microcapsules of urea-formaldehyde or melamine-formaldehyde, forming in this way a thermoplastic second wall.

The binding thermoplastic polymer between microcapsules and fibres should be resistant to washing in water or to dry-cleaning, in order to last longer during the lifetime of the textile article. The most appropriate articles for the application of microcapsules with thermoplastic outer walls are non-woven webs used in winter or sports coats and eiderdowns. In eiderdowns the fibres should preferably be made up of bicomponent thermobonded fibres.

They can also be applied, for example, on a less voluminous spun-bonded non-woven which can be used together with the web as an alternative to the direct application of microcapsules of PCM to the web. The spun-bonded non-woven would be on the nearest side to the body, so that the microcapsules of PCM would be nearer the body. Spun-bonded non-wovens can be used on their own in several layers, in articles where volume is neither important nor desirable.

The outer wall can be also fused with a foam or a coating made up of thermoplastic material, making it easier to apply a "hot-melt" process.

As can be seen on the drawings enclosed herewith, FIG. 1 represents non-thermoplastic fibres or continuous filaments (1), with bicomponent microcapsules (2) with exterior thermoplastic outside wall (3).

Figure 2:
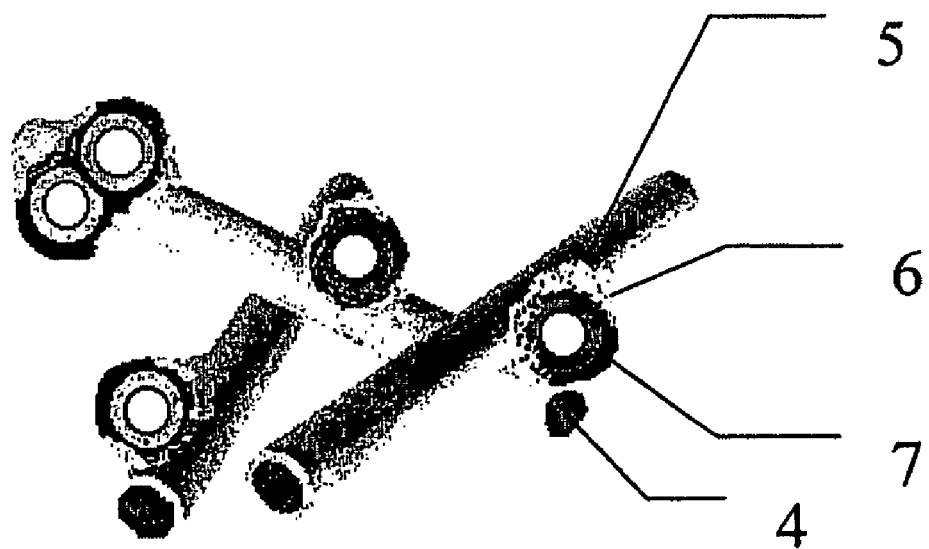
FIG. 2 represents bicomponent fibres or filaments melted together with microcapsules with a thermoplastic outside wall.

FIG. 2 represents bicomponent fibres or continuous filaments (4) with exterior thermoplastic wall (5), with bicomponent thermoplastic capsules (6) with exterior thermoplastic wall (7).

EXAMPLE

1 Kg of microcapsules of phase change materials with a melamine-formaldehyde wall was dispersed in 10 liters of water and 5 Kg of styrene were added together with 100 g of benzoyl peroxide. The mixture was heated up to a temperature between 50° C. and 100° C. and left to react for a period between 20 minutes to 2 hours. It was then filtered and left to dry at a temperature of 60° C.

The invention claimed is:

1. A method of applying a plurality of microcapsules to an outside surface of textile fibres, without the use of binders, the microcapsules not being disposed within the fibre, and the textile fibres being formed into a yarn, fabric or non-woven textile prior to application of the microcapsules, each microcapsule comprising a body having inner and outer polymer walls, the outer wall being thermoplastic for the purpose of thermal fusion onto an outside surface of textile fibres that form a textile substrate such that the microcapsule is connected to a fibre only by the points of contact of the microcapsule outer polymer wall and the fibre outer surface; and a microencapsulated material disposed within the body, the method comprising:

adhering the outer wall of the microcapsules onto the outer wall of the textile fibres, manufactured as a yarn, fabric or non-woven, by heating up to at least a softening temperature, of the thermoplastic wall, wherein no film is formed between the microcapsules during the thermal fusing with the fibre and permeability of the fibre to air and vapor remains, along with both flexibility and drape of the textile fibres.

2. The method, in accordance with claim 1, where pressure is also applied to help fusing microcapsules and fibres together.

3. The method of application of microcapsules, in accordance with claim 1, in which the outer wall of the microcapsules are fused with a thermoplastic foam or coating.

4. An article which is of yarn, fabric or non-woven textile, the article comprising:

fibres having an outer wall and microcapsules which are not disposed within the fibre, each microcapsule comprising a body having inner and outer polymer walls, the outer wall being thermoplastic for the purpose of thermal fusion onto an outer wall of the fibres formed into a textile substrate such that the microcapsule is connected to a fibre only by the points of contact of the microcapsule outer polymer wall and the fibre outer surface; and a microencapsulated material disposed within the body, in which the microcapsules are stuck to the outer wall of the fibres by the fusion of the outer thermoplastic wall on the outer wall of the fibres without the use of binders, the microcapsules being applied to the outer surface of the yarn, fabric or non-woven textile without the use of binders, the microcapsules not being disposed within the fibre, and the textile fibres being formed into a yarn, fabric or non-woven textile prior to application of the microcapsules;

wherein no film is formed between the microcapsules and the fibre during the thermal fusing with the fibre and permeability of the fibre to air and vapor remains, along with both flexibility and drape of the article.

5. An article in accordance with claim 4, in which the fibres also have a thermoplastic wall, which melts at temperatures near the melting temperature of the thermoplastic polymer of the microcapsule wall, fusing together during the process of application of the microcapsules.

6. The method in accordance with claim 1, wherein the heating is up to a melting temperature of the outer wall material.

* * * * *